(12) United States Patent
Decesaris et al.

(10) Patent No.: US 9,465,761 B2
(45) Date of Patent: Oct. 11, 2016

(54) MANAGING SLAVE DEVICES

(71) Applicant: Lenovo Enterprise Solutions (Singapore) Pte. Ltd., Singapore (SG)

(72) Inventors: Michael Decesaris, Carrboro, NC (US); James J. Parsonese, Cary, NC (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 545 days.

(21) Appl. No.: 13/946,655

(22) Filed: Jul. 19, 2013

(65) Prior Publication Data

US 2015/0026374 A1    Jan. 22, 2015

(51) Int. Cl.
*G06F 13/40* (2006.01)
*G06F 11/30* (2006.01)

(52) U.S. Cl.
CPC ........... *G06F 13/40* (2013.01); *G06F 11/3058* (2013.01)

(58) Field of Classification Search
CPC .............................. G06F 3/40; G06F 11/3058
See application file for complete search history.

(56) References Cited

U.S. PATENT DOCUMENTS

| | | | |
|---|---|---|---|
| 5,948,077 A * | 9/1999 | Choi | G06F 13/4068 340/3.5 |
| 6,109,102 A * | 8/2000 | Schneider | B60T 8/171 73/488 |
| 7,521,963 B1 | 4/2009 | Xin-LeBlanc | |
| 8,292,503 B2 | 10/2012 | Pan | |
| 2002/0147949 A1 | 10/2002 | Lamb et al. | |
| 2003/0058080 A1 * | 3/2003 | Pike | G06F 1/20 340/3.9 |
| 2004/0267486 A1 | 12/2004 | Percer et al. | |
| 2005/0021260 A1 * | 1/2005 | Robertson | G01R 31/30 702/75 |
| 2005/0062529 A1 * | 3/2005 | Gan | H03F 1/0211 330/136 |
| 2007/0077065 A1 * | 4/2007 | Forsberg | H04B 10/0775 398/30 |

(Continued)

FOREIGN PATENT DOCUMENTS

CN          202145308 U    2/2012
DE     102004046186 A1    4/2006

(Continued)

OTHER PUBLICATIONS

National Semiconductor, "Temperature Sensor Handbook: 6. Datasheets", Copyright National Semiconductor Corporation, 1994-1997, pp. 1-40.

(Continued)

*Primary Examiner* — Tim T Vo
*Assistant Examiner* — Phong H Dang
(74) *Attorney, Agent, or Firm* — Law Office of Jim Boice

(57) ABSTRACT

A hardware system comprises a digital signal generator, which generates a digital electrical signal that describes a first physical state of a first device; an analog electrical signal generator, which generates an analog electrical signal that describes a second physical state of the first device; a hybrid digital state signal generator, which generates a hybrid digital state signal that comprises the analog electrical signal overlaid onto the initial digital electric signal; and a hybrid signal transmitter, which transmits the hybrid digital state signal from the first device to a second device, wherein the second device comprises a hybrid signal receiver/decoder that extracts the analog electrical signal from the hybrid digital state signal.

19 Claims, 5 Drawing Sheets

(56) References Cited

U.S. PATENT DOCUMENTS

| | | |
|---|---|---|
| 2008/0162770 A1 | 7/2008 | Titiano et al. |
| 2008/0195764 A1 | 8/2008 | Deshpande et al. |
| 2008/0270633 A1 | 10/2008 | Dalton et al. |
| 2008/0307134 A1 | 12/2008 | Geissler et al. |
| 2010/0164421 A1 | 7/2010 | Dishman et al. |
| 2010/0325325 A1 | 12/2010 | Fernald et al. |
| 2011/0153798 A1 | 6/2011 | Groenendaal et al. |
| 2011/0301777 A1 | 12/2011 | Cox et al. |
| 2012/0173944 A1 | 7/2012 | Pan |
| 2012/0191889 A1 | 7/2012 | Fischer et al. |

FOREIGN PATENT DOCUMENTS

| | | |
|---|---|---|
| JP | 2000165420 A | 6/2000 |
| JP | 2005018762 A | 1/2005 |
| JP | 2006302018 A | 11/2006 |
| WO | 2012135973 A1 | 10/2012 |

OTHER PUBLICATIONS

H. Laffitte et al., "Power Balancing (TM) in Future-Generation CCI Blades", HP, HP Tech Con 2004, pp. 1-10.

D. C. Snowdon, S. M. Petters, and G. Heiser. "Power measurement as the basis for power management", In 2005 WS Operat. System Platforms for Embedded Real-Time applications, Palma, Mallorca, Spain, Jul. 2005, pp. 1-10.

\* cited by examiner

MANAGING SLAVE DEVICES

BACKGROUND

The present disclosure relates to the field of electronic systems, and specifically to electronic systems that include master and slave devices. Still more particularly, the present disclosure relates to managing slave devices with a master device.

Current electrical systems often include master devices and slave devices, where the master devices control the operations of the slave devices. Such master devices often poll the slave devices for state information about the slave devices. Examples of such state information includes, but is not limited to, temperature readings at the slave device, power usage by the slave device, identification information for the slave device, manufacturer information about the slave device, memory/buffer states of the slave device, and/or clock speeds of busses and/or processors in the slave device.

SUMMARY

In one embodiment of the present invention, a hardware system comprises a digital signal generator, which generates a digital electrical signal that describes a first physical state of a first device; an analog electrical signal generator, which generates an analog electrical signal that describes a second physical state of the first device; a hybrid digital state signal generator, which generates a hybrid digital state signal that comprises the analog electrical signal overlaid onto the initial digital electric signal; and a hybrid signal transmitter, which transmits the hybrid digital state signal from the first device to a second device, wherein the second device comprises a hybrid signal receiver/decoder that extracts the analog electrical signal from the hybrid digital state signal.

In one embodiment of the present invention, a method of managing slave devices comprises: generating, by a hardware digital electrical signal generator, a digital electrical signal that describes a first physical state of a first device; generating, by a hardware analog electrical signal generator, an analog electrical signal that describes a second physical state of the first device; generating, by a hardware hybrid digital state signal generator, a hybrid digital state signal that comprises the analog electrical signal overlaid onto the initial digital electric signal; and transmitting, by a hybrid signal transmitter, the hybrid digital state signal from the first device to a second device, wherein the second device comprises a hybrid signal receiver/decoder that extracts the analog electrical signal from the hybrid digital state signal.

BRIEF DESCRIPTION OF SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
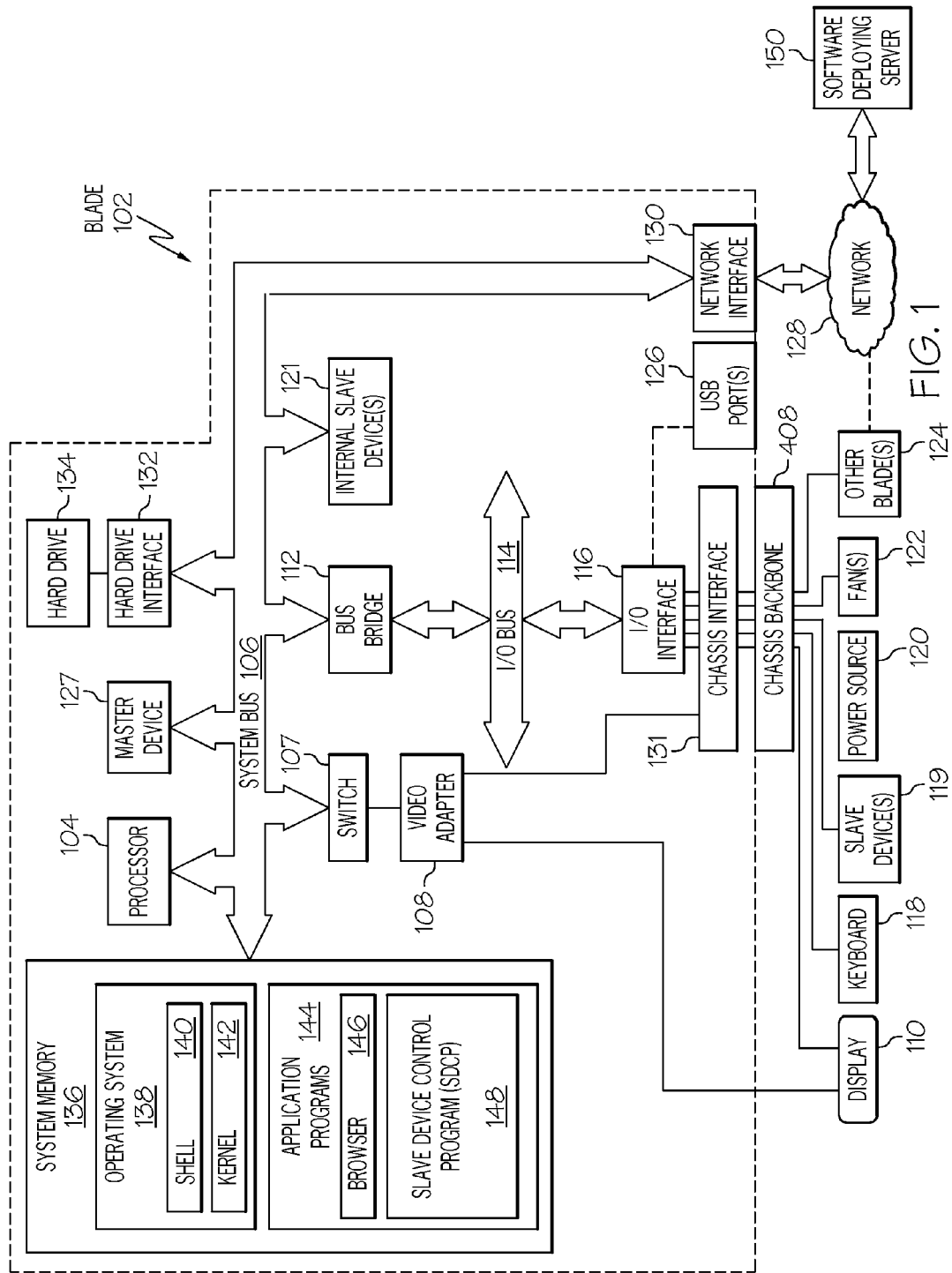
FIG. 1 depicts an exemplary blade server that may be utilized by the present invention.
Figure 4:
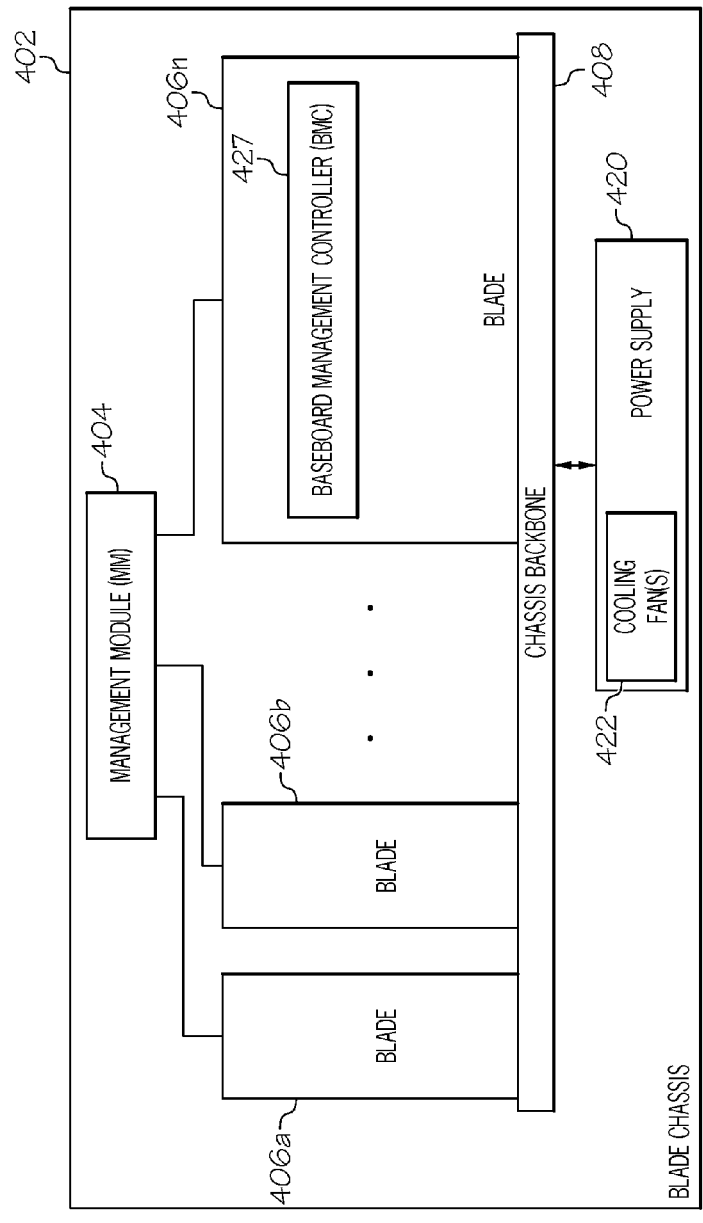
FIG. 4 illustrates an exemplary blade chassis in which the present invention may be implemented.

With reference now to the figures, and in particular to FIG. 1, there is depicted a block diagram of an exemplary blade 102, which may be utilized by the present invention. Blade 102 is a component of a server blade chassis (depicted below in FIG. 4 as blade chassis 402). Blade chassis 402 shown in FIG. 4 is usually utilized as a server; thus, blade 102 may be referenced as a server blade. Note that some or all of the exemplary architecture shown for blade 102 may be utilized by software deploying server 150 and/or other blades 124 (e.g., blades 406a-406n depicted in FIG. 4), which may be within a same blade chassis as blade 102.

Blade 102 includes a processor unit 104 that is coupled to a system bus 106. Processor unit 104 may utilize one or more processors, each of which has one or more processor cores. A video adapter 108, which drives/supports a display 110, is also coupled to system bus 106, either via a chassis interface 131 to a chassis backbone 408 (described in greater detail below), or via a switch 107, which is a mechanical switch that allows the display 110 to be coupled to the system bus 106, and thus to be functional.

System bus 106 is coupled via a bus bridge 112 to an Input/Output (I/O) bus 114. An I/O interface 116 is coupled to I/O bus 114. I/O interface 116 affords communication with various I/O devices either directly or via the chassis interface 131, which is hardware and/or software that allows the blade 102 to be coupled to chassis backbone 408 in a blade chassis (described in further detail in FIG. 4). Once coupled to the chassis backbone 408, the blade 102 is able to communicate with other devices in addition to the display 110, including a keyboard 118, slave device(s) 119, a power source 120, fan(s) 122, other blade(s) 124 that are within a blade chassis, and USB port(s) 126. Note that while other blade(s) 124 are shown as being coupled to blade 102 via the chassis interface 131, in one embodiment these other blade(s) 124 can be coupled to blade 102 via network 128, particularly if network 128 is a Local Area Network (LAN) within a blade center. While the format of the ports connected to I/O interface 116 may be any known to those skilled in the art of computer architecture, in a preferred embodiment some or all of these ports are Universal Serial Bus (USB) ports. Also coupled to system bus 106 is a master device 127, which is one embodiment is a Baseboard Management Controller (BMC) (e.g., BMC 427 depicted in FIG. 4).

As depicted, blade 102 is able to communicate with a software deploying server 150 and, in one embodiment, with other blade(s) 124 within a blade chassis, via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in blade 102. This volatile memory includes additional higher levels of volatile memory (not shown), including, but not limited to, cache memory, registers and buffers. Data that populates system memory 136 includes blade 102's Operating System (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., blade 102) to send and receive network messages to the Internet using HyperText Transfer Protocol (HTTP) messaging, thus enabling communication with software deploying server 150 and other described computer systems.

Application programs 144 in blade 102's system memory (as well as software deploying server 150's system memory) also include a Slave Device Control Program (SDCP) 148. SDCP 148 includes code for implementing the processes described below, including those described in FIGS. 2-6. In one embodiment, blade 102 is able to download SDCP 148 from software deploying server 150, including in an on-demand basis. Note further that, in one embodiment of the present invention, software deploying server 150 performs all of the functions associated with the present invention (including execution of SDCP 148), thus freeing blade 102 from having to use its own internal computing resources to execute SDCP 148.

The hardware elements depicted in blade 102 are not intended to be exhaustive, but rather are representative to highlight essential components required by the present invention. For instance, blade 102 may include alternate memory storage devices such as magnetic cassettes, Digital Versatile Disks (DVDs), Bernoulli cartridges, and the like. These and other variations are intended to be within the spirit and scope of the present invention.

Figure 2:
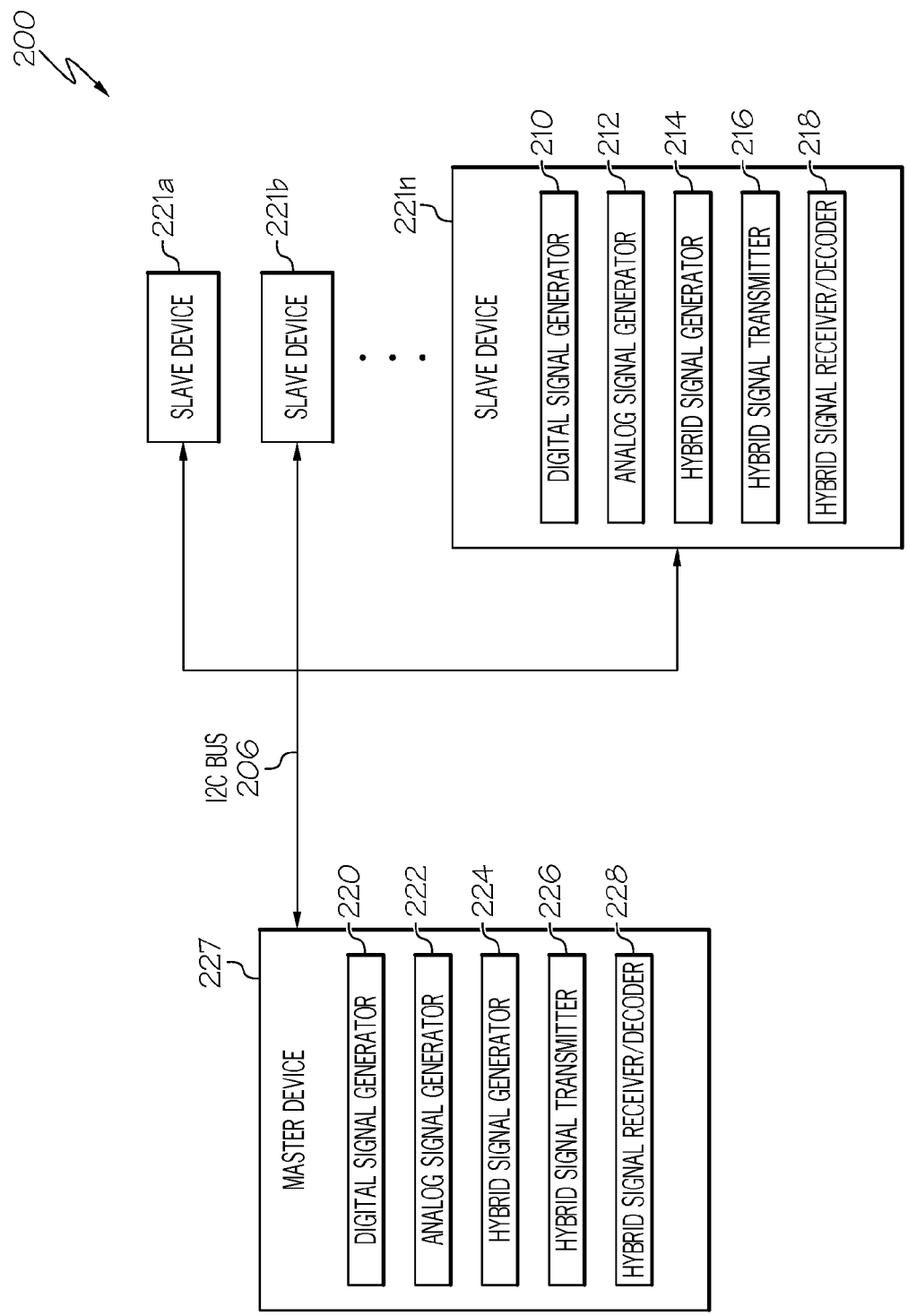
FIG. 2 illustrates a circuit containing a master device and one or more slave devices that are enabled with components used by one or more embodiments of the present invention.

With reference now to FIG. 2, an exemplary circuit 200 containing a master device 227 and one or more slave devices 221a-221n (where "n" is an integer") in accordance with one or more embodiments of the present invention is presented. As depicted for exemplary purposes, circuit 200 comports with the Inter-Integrated Circuit (I2C) protocol. As known to those skilled in the art of circuits and busses, I2C uses two bidirectional open-drain lines, a Serial Data Line (SDA) and Serial Clock Line (SCL), on an I2C bus 206. As their names suggest, the SDA is typically used to transmit data, while the SCL carries a clock signal. In one embodiment, voltages used by signals (generated by the I2C devices) on the SDA/SCL lines are either at +5 V or +3.3 V, with working ranges that extend either way (e.g., 0.2V). For example, a +5 V line will recognize any voltage between 4.8V and 5.2V as a "0" (and 0.0V-0.2V as a "1"), while a +3.3 V line will recognize any voltage between 3.2V and 3.5V as a "0" (and 0.0V-0.2V as a "1").

Although either the master device 227 or any of the slave devices 221a-221n may generate a clock signal on the SCL and transmit data on the SDA, the master device 227 initiates communication with the slave devices 221a-221n.

Assume now that master device 227 is monitoring the status of operations in one or more of the slave devices 221a-221n. Examples of such states/statuses of the slave devices 221a-221n include, but are not limited to, the present temperature of one or more of the slave devices 221a-221n, the amount of current being drawn by one or more of the slave devices 221a-221n, the speed of a fan in one or more of the slave devices 221a-221n, the processor and/or bus clock speed in one or more of the slave devices 221a-221n, the amount of room available in a buffer or memory in one or more of the slave devices 221a-221n, etc. In a traditional master/slave relationship, the master device would send an inquiry message to one or more of the slave devices 221a-221n regarding the present state status of the slave(s), and then wait for a response to the inquiry message. However, this results in a time delay between when the inquiry message is sent and the state status information is returned. The present invention overcomes this limitation by overlaying an analog signal onto a digital signal being sent from one or more of the slave devices 221a-221n.

For example, consider slave device 221n, which, like slave devices 221a-221b, has a digital signal generator 210, an analog signal generator 212, a hybrid signal generator 214, a hybrid signal transmitter 216, and a hybrid signal receiver/decoder 218, all of which are hardware devices. Thus, the digital signal generator 210 is a hardware digital electrical signal generator, which generates a digital electrical signal that describes a state or status or operation of slave device 221n, such as the fan speed of a fan within slave device 221n, how much current is being drawn by slave device 221n, a Universally Unique Identifier (UUID) of slave device 221n, etc. In one embodiment, the digital signal is transmitted continuously to the master device 227.

When a change to a state/status/operation occurs, the analog signal generator 212, which is a hardware analog electrical signal generator, generates an analog electrical signal that indicates the presence of this state/status/operation change. This analog signal is then overlaid onto the digital electrical signal (which was created by the digital signal generator 210) by the hybrid signal generator 214 to generate a hybrid digital state signal. For example, consider the waveform of the hybrid digital state signal 300 depicted in FIG. 3. Under nominal conditions (i.e., there is no additional state/status information to be conveyed), the waveform would peak at the I2C voltage (i.e., +3.3V or +5.0V) shown by dashed line 301, thus indicating a "0" whenever pulled up to this voltage (see pulse 302). When the pulse drops down to 0.0V (see pulse 304), a "1" is indicated. However, by overlaying an analog electrical signal onto the digital electrical signal, additional information can be gleaned from the waveform. That is, assume that pulses 302 and 304 are typical for the waveform when the current being drawn (by the slave device that generated the waveform) is at a level of "Current x". However, if that slave device suddenly pulls more current (at a level of "Current y"), this additional current being drawn is represented by the additional area 308 in pulse 306. That is, when only "Current x" is being drawn by slave device 221n, then the pulses in waveform 300 only reach the voltage level depicted by dashed line 301. However, when the higher "Current y" is being drawn by slave device 221n, then the pulses in waveform 300 will extend above the voltage level depicted by dashed line 301.

Figure 3:
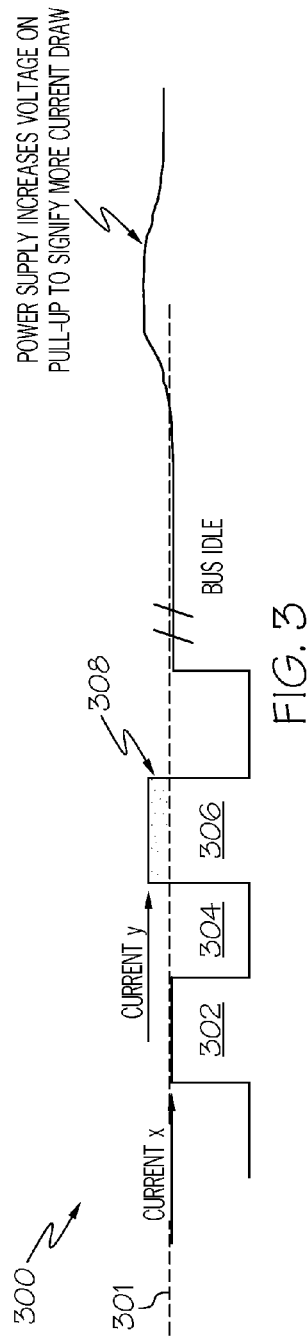
FIG. 3 depicts an exemplary information signal between a master device and a slave device in accordance with one embodiment of the present invention.

Note that the differential in pulse heights depicted in FIG. 3 may be for the same or different types of state depicted by the change in pulse height. That is, in one embodiment, pulses 302 and 304 may depict how much current is being drawn by slave device 221n, while the area 308 in heightened pulses (starting with pulse 306) may indicate a higher voltage being delivered to slave device 221n. In another embodiment, however, the differential in pulse heights depicted in FIG. 3 may be for different types of state depicted by the change in pulse height. For example, pulses 302 and 304 may depict how much current is being drawn by slave device 221n, while the area 308 in heightened pulses (starting with pulse 306) may indicate that a bus buffer in slave device 221n has reached a certain predefined saturation level (e.g., it cannot hold any more new data).

Continuing with FIG. 2, the hybrid digital state signal (e.g., waveform 300) is sent by the hybrid signal transmitter 216 in slave device 221n to a hybrid signal receiver/decoder 228 in the master device 227. The hybrid signal receiver/decoder 228 then extracts the analog electrical signal (e.g., the analog signal represented by area 308 in FIG. 3) from the hybrid digital state signal. The hybrid signal receiver/decoder 228 uses this analog signal (which in one embodiment is first digitized) to compare with a lookup table (not shown). This comparison allows the master device 227 to be informed about the new state/status information about the slave device 221n. For example, if the area of area 308 is 10 units, and the master device 227 knows the pulse width of waveform 300 and what type of information will be described by area 308, then the lookup table will identify the delta in current being drawn by slave device 221n as "Current y"—"Current x" (i.e., "Current z", or an additional 10 mA).

While the invention has been described as monitoring conditions in slave device 221n and/or any of the slave devices 221a-221n, in one embodiment the hybrid digital state signal is used by the master device 227 to control operations in one or more of the slave devices 221a-221n. As depicted in FIG. 2, master device 227 also has a digital signal generator 220, an analog signal generator 222, a hybrid signal generator 224, a hybrid signal transmitter 226, and a hybrid signal receiver/decoder 228, all of which are hardware devices, which are analogous in operation to the digital signal generator 210, analog signal generator 212, hybrid signal generator 214, hybrid signal transmitter 216, and hybrid signal receiver/decoder 218 depicted within slave device 221n. In this scenario, however, the waveform 300 depicted in FIG. 3 is used as a control signal, rather than a reporting signal, as described above. That is, the area 308 is used in this embodiment to instruct the slave device 221n to change one or more of its states. Thus, hybrid signal receiver/decoder 218 in slave device 221n will strip off (and optionally digitize) the analog signal (e.g., area 308) from the waveform 300, compare this analog signal to a lookup table, and (in the example shown in FIG. 3) increase the amount of current that it draws from the level of "Current x" to "Current y".

Again, note that the analog information in area 308 may be used to instruct the one or more of the slave devices 221a-221n to adjust any state status, such as changing fan speeds, increasing internal clock speeds, releasing data from a buffer or memory, etc.

Note that while digital signal generator 210, analog signal generator 212, hybrid signal generator 214, hybrid signal transmitter 216, and hybrid signal receiver/decoder 218 are depicted as components of slave device 221n, and digital signal generator 220, analog signal generator 222, hybrid signal generator 224, hybrid signal transmitter 226, and hybrid signal receiver/decoder 228 are depicted as components of master device 227, in one embodiment one or more of these devices are actually located within another system, such as a system (either pictured or not pictured in FIG. 1) that is coupled to network 128 in FIG. 1.

With reference now to FIG. 4, an exemplary blade chassis 402 in which the present invention may be implemented is presented. More specifically, the master device 227 depicted in FIG. 2 may be a Baseboard Management Controller (BMC), such as BMC 427 within a blade 406n in the blade chassis 402. BMC 427 is a specialized microcontroller on a motherboard, such as that found in blade 406n. That is, BMC 427 manages an interface between system management software within blade 406n and platform hardware found within blade 406n. Thus, sensors (not depicted) within blade 406n, which report on such statuses/parameters as temperature, cooling fan speeds, power status, local Operating System (OS) statuses, etc., provide information such as that described above with respect to waveform 300 in FIG. 3. In other words, BMC 427 is a specialized microcontroller that manages the overall health and environment of a blade such as blade 406n. This management includes both the monitoring as well as the control of cooling fans, power supplies, other hardware devices, as well as OS and application management within the blade 406n. In one embodiment, the BMC 427 sends warnings and alerts regarding anomalies to such monitored activities to an administrator (not shown).

As depicted in FIG. 4, the blade chassis 402 includes multiple blades 406a-406n, which are coupled to a chassis backbone 408. These blades 406a-406n are controlled and/or managed at a higher level by a Management Module (MM) 404, which transmits messages to and from an administrator of the blade chassis.

As described above in FIG. 2, the master device 227 and one or more of the slave devices 221a-221n may all be within a same unit, such as blade 406n. In one embodiment, however, the master device 227 is within the blade 406n, but the slave device 221n is external to the blade 406n, as depicted in FIG. 4 by exemplary power supply 420, which has its own cooling fan(s) 422. Thus, the BMC 427 monitors and/or controls the operations of the slave power supply 420 using the hybrid digital state signal described herein.

Figure 5:
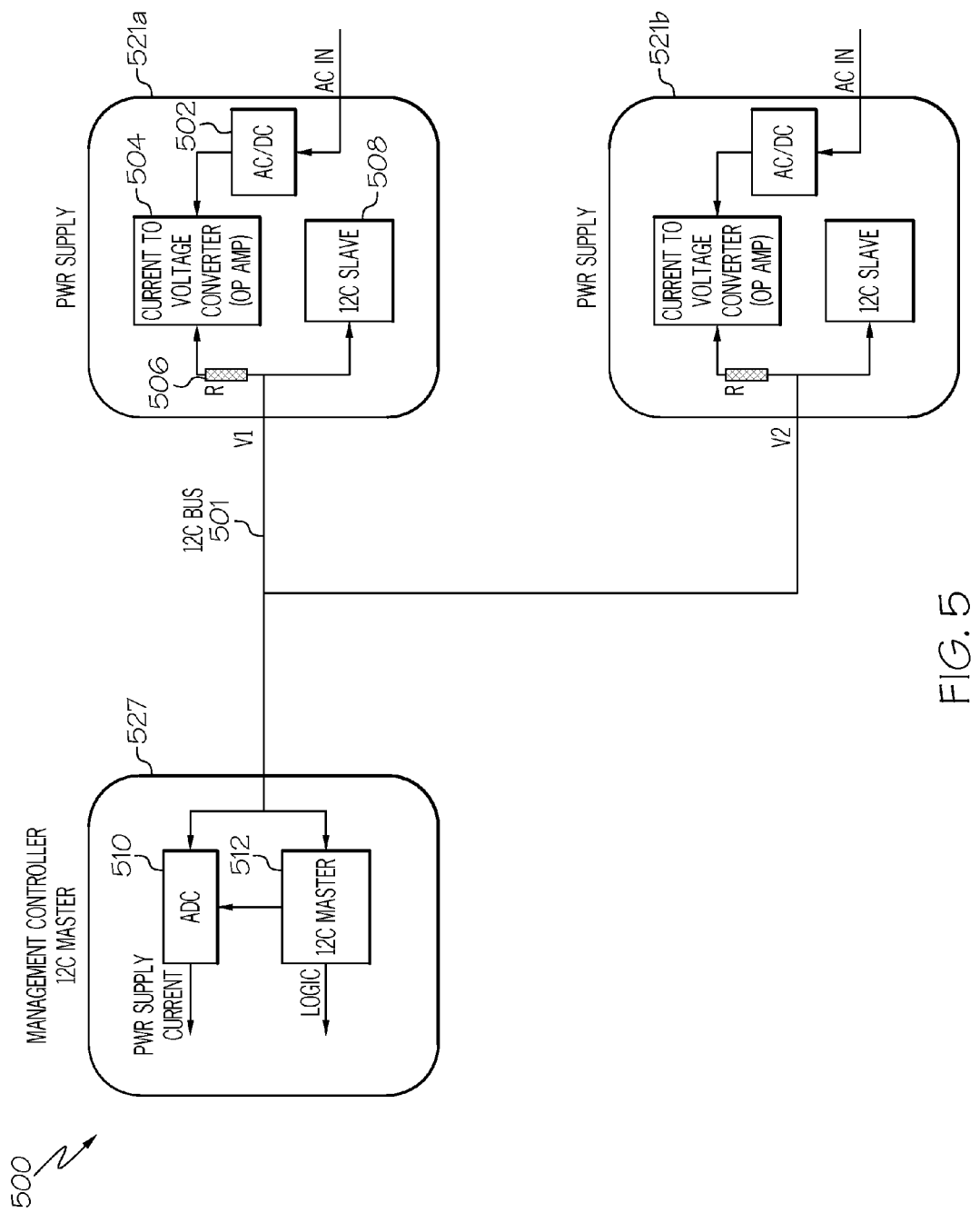
FIG. 5 depicts an exemplary system in which different slave devices are identified by their use of different voltage levels when communicating with a master device.

Referring now to FIG. 5, an exemplary system 500 in which different slave devices 521a-521b are identified by their use of different voltage levels when communicating with a master device is presented. System 500 comprises a master device 527 (which for exemplary purposes is a management controller that includes an I2C master component 512 and an Analog-to-Digital Converter (ADC) 510). An I2C bus 501 couples the master device 527 to multiple slave devices 521a-521b, which are depicted for exemplary purposes as power supplies, each of which has an AC/DC converter 502, a current to voltage converter 504 (e.g., a differential amplifier such as an op-amp), and a pull-up resister 506 that is selectively controlled by an I2C slave component 508. In the example shown in FIG. 5, if the AC voltage in to the AC/DC converter 502 exceeds a predetermined nominal voltage level (as determined by the voltage converter 504), then the pull-up resister 506 is closed, causing the I2C slave component 508 to pull the I2C bus 501 high in order to reflect the higher-than-nominal voltage. This higher-than-nominal voltage is thus higher than the nominal signal voltage for waveforms coming out of the slave device 521*a*. However, in this embodiment, slave device 521*a* and slave device 521*b* have different nominal signal voltages, depicted respectively as V1 and V2. That is, assume that the nominal signal voltage V1 is +3.3V, and the nominal signal voltage V2 is +5.0V. Assume further that an abnormal increase in current being drawn by either slave device results in an additional 0.2V being placed on the I2C bus 501. In this scenario, the I2C master 512 will recognize a waveform voltage of +3.5V as 1) being from slave device 521*a* and 2) indicative of an abnormal increase in current being drawn by slave device 521*a*. Similarly, I2C master 512 will recognize a waveform voltage of +5.2V as 1) being from slave device 521*b* and 2) indicative of an abnormal increase in current being drawn by slave device 521*b*. Using hardware circuitry depicted as ADC 510 (analogous in functionality to the hybrid signal receiver/decoder 228 depicted in FIG. 2), master device 527 determines what level of additional current is being drawn, and by which slave device.

Figure 6:
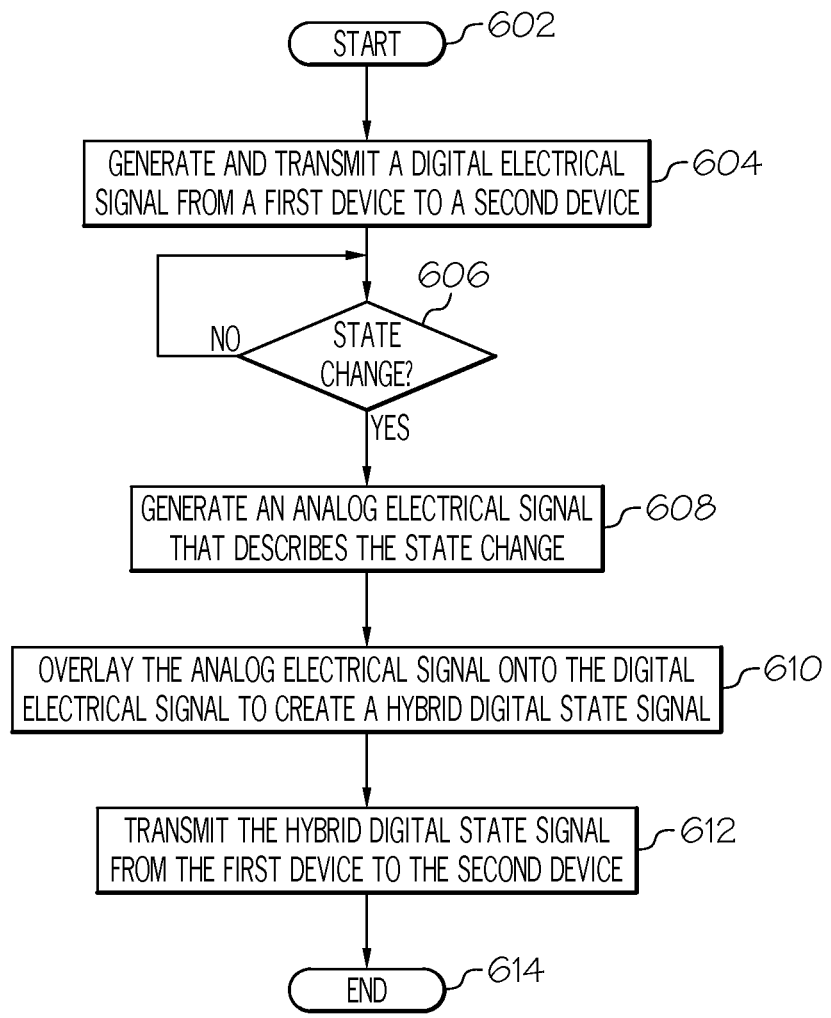
FIG. 6 is a flow-chart of exemplary steps taken to manage one or more slave devices.

With reference now to FIG. 6, a high-level flowchart of exemplary steps taken to manage one or more slave devices is presented. After initiator block 602, a hardware digital electrical signal generator generates a digital electrical signal that describes a first physical state of a first device (e.g., a slave device), and sends this digital electrical signal to a second device (e.g., a master device), as described in block 604.

As described in query block 606, if a change in the state of the slave device occurs (or is desired to occur, according to the master device), then a hardware analog electrical signal generator generates an analog electrical signal that describes a second physical state of the first device (block 608). As described in block 610, a hardware hybrid digital state signal generator generates a hybrid digital state signal, which comprises the analog electrical signal overlaid onto the digital electrical signal. As described in block 612, a hardware hybrid signal transmitter then transmits the hybrid digital state signal from the first device to a second device, where the second device comprises a hardware hybrid signal receiver/decoder that extracts the analog electrical signal from the hybrid digital state signal. The process ends at terminator block 614.

As described herein, in one embodiment of the inventive method the hardware hybrid signal receiver/decoder extracts the digital electrical signal from the hybrid digital state signal.

As described herein, in one embodiment of the inventive method the first physical state and the second physical state are a same type of state in the first device.

As described herein, in one embodiment of the inventive method the first physical state and the second physical state are different types of states in the first device.

As described herein, in one embodiment of the inventive method the first device is a slave device and the second device is a master device, and the analog electrical signal describes a present state of the slave device.

As described herein, in one embodiment of the inventive method the second device is a slave device and the first device is a master device, and the analog electrical signal instructs the slave device to achieve the second physical state.

As described herein, in one embodiment of the inventive method the first device is an Inter-Integrated Circuit (I2C) baseboard management controller in a server blade within a server blade chassis, and the second device is an I2C slave device within the server blade.

As described herein, in one embodiment of the inventive method the second device is a master device and the first device is a slave device. In a further embodiment, a third device (i.e., another slave device) is coupled to the master device. As described above, the first device and the third device both comprise an instance of the digital electrical signal generator, and the first device and the third device generate the digital electrical signal at different voltage levels, such that the different voltage levels provide an identity of the first device and the third device to the master device.

In one embodiment of the inventive method, the first device (e.g., the slave device) is an Inter-Integrated Circuit (I2C) device from a group consisting of an I2C bus buffer, an I2C input/output (I/O) expander, an I2C digital-to-analog converter (DAC), an I2C analog-to-digital converter (ADC), and an I2C electrically erasable programmable read-only-memory (EEPROM).

As described herein, in one embodiment the second physical state of the first device is an increase in current being drawn by the first device.

As described herein, one embodiment of the present invention is a system that comprises: a hardware digital electrical signal generator, wherein the hardware digital electrical signal generator generates a digital electrical signal that describes a first physical state of a first device; a hardware analog electrical signal generator, wherein the hardware analog electrical signal generator generates an analog electrical signal that describes a second physical state of the first device; a hardware hybrid digital state signal generator, wherein the hardware hybrid digital state signal generator generates a hybrid digital state signal that comprises the analog electrical signal overlaid onto the digital electrical signal; and a hardware hybrid signal transmitter, wherein the hardware hybrid signal transmitter transmits the hybrid digital state signal from the first device to a second device, wherein the second device comprises a hardware hybrid signal receiver/decoder that extracts the analog electrical signal from the hybrid digital state signal.

As described herein, in one embodiment of the inventive system the hardware hybrid signal receiver/decoder extracts the digital electrical signal from the hybrid digital state signal.

As described herein, in one embodiment of the inventive system the first physical state and the second physical state are a same type of state in the first device.

As described herein, in one embodiment of the inventive system the first physical state and the second physical state are different types of states in the first device.

As described herein, in one embodiment of the inventive system the first device is a slave device and the second device is a master device, and wherein the analog electrical signal describes a present state of the slave device.

As described herein, in one embodiment of the inventive system the second device is a slave device and the first device is a master device, and wherein the analog electrical signal instructs the slave device to achieve the second physical state.

As described herein, in one embodiment of the inventive system the first device is an Inter-Integrated Circuit (I2C) baseboard management controller in a server blade within a server blade chassis, and the second device is an I2C slave device within the server blade.

As described herein, in one embodiment of the inventive system the second device is a master device and the first device is a slave device, and the hardware system further comprises: a third device coupled to the master device, wherein the third device is a slave device, wherein the first device and the third device both comprise an instance of the digital electrical signal generator, and wherein the first device and the third device generate the digital electrical signal at different voltage levels, wherein the different voltage levels provide an identity of the first device and the third device to the master device.

As described herein, in one embodiment of the inventive system the first device (e.g., the slave device) is an Inter-Integrated Circuit (I2C) device from a group consisting of an I2C bus buffer, an I2C input/output (I/O) expander, an I2C digital-to-analog converter (DAC), an I2C analog-to-digital converter (ADC), and an I2C electrically erasable programmable read-only-memory (EEPROM).

As described herein, in one embodiment of the inventive system the second physical state of the first device is an increase in current being drawn by the first device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, when is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A system comprising:
  a hardware digital electrical signal generator, wherein the hardware digital electrical signal generator generates a digital electrical signal that describes a first physical state of a first device;
  a hardware analog electrical signal generator, wherein the hardware analog electrical signal generator generates an analog electrical signal that describes a second physical state of the first device;
  a hardware hybrid digital state signal generator, wherein the hardware hybrid digital state signal generator generates a hybrid digital state signal that comprises the analog electrical signal overlaid onto the digital electrical signal, wherein the analog electrical signal increases a voltage level of the digital electrical signal, and wherein an increase to the voltage level of the digital electrical signal defines an area above a pulse in the digital electrical signal, and wherein the area above the pulse describes a change in current being pulled by the first device, and wherein the hybrid digital state signal retains all information from the digital electrical signal and the analog electrical signal; and
  a hardware hybrid signal transmitter, wherein the hardware hybrid signal transmitter transmits the hybrid digital state signal from the first device to a second device, wherein the second device comprises a hardware hybrid signal receiver/decoder that extracts the analog electrical signal from the hybrid digital state signal.

2. The system of claim 1, wherein the hardware hybrid signal receiver/decoder extracts the digital electrical signal from the hybrid digital state signal.

3. The system of claim 2, wherein the first physical state and the second physical state are a same type of state in the first device.

4. The system of claim 1, wherein the first device is a slave device and the second device is a master device, and wherein the analog electrical signal describes a present state of the slave device.

5. The system of claim 1, wherein the first device is a slave device and the second device is a master device, and wherein the analog electrical signal instructs the slave device to achieve the second physical state.

6. The system of claim 1, wherein the first device is an Inter-Integrated Circuit (I2C) baseboard management controller in a server blade within a server blade chassis, and wherein the second device is an I2C slave device within the server blade.

7. The system of claim 1, wherein the second device is a master device and the first device is a slave device, and wherein the hardware system further comprises:
  a third device coupled to the master device, wherein the third device is a slave device, wherein the first device and the third device both comprise an instance of the digital electrical signal generator, and wherein the first device and the third device generate the digital electrical signal at different voltage levels, wherein the different voltage levels provide an identity of the first device and the third device to the master device.

8. The system of claim 1, wherein the first device is an Inter-Integrated Circuit (I2C) device from a group consisting of an I2C bus buffer, an I2C Input/Output (I/O) expander, an I2C Digital-to-Analog Converter (DAC), an I2C Analog-to-Digital Converter (ADC), and an I2C Electrically Erasable Programmable Read-Only-Memory (EEPROM).

9. The system of claim 1, wherein the second physical state of the first device is an increase in current being drawn by the first device.

10. A method of managing slave devices, the method comprising:
  generating, by a hardware digital electrical signal generator, a digital electrical signal that describes a first physical state of a first device;
  generating, by a hardware analog electrical signal generator, an analog electrical signal that describes a second physical state of the first device;
  generating, by a hardware hybrid digital state signal generator, a hybrid digital state signal that comprises the analog electrical signal overlaid onto the digital electrical, wherein the analog electrical signal increases a voltage level of the digital electrical signal, and wherein an increase to the voltage level of the digital electrical signal defines an area above a pulse in the digital electrical signal, and wherein the area above the pulse describes a change in current being pulled by the first device, and wherein the hybrid digital state signal retains all information from the digital electrical signal and the analog electrical signal; and
  transmitting, by a hardware hybrid signal transmitter, the hybrid digital state signal from the first device to a second device, wherein the second device comprises a hardware hybrid signal receiver/decoder that extracts the analog electrical signal from the hybrid digital state signal.

11. The method of claim 10, wherein the hardware hybrid signal receiver/decoder extracts the digital electrical signal from the hybrid digital state signal.

12. The method of claim 11, wherein the first physical state and the second physical state are a same type of state in the first device.

13. The method of claim 11, wherein the first physical state and the second physical state are different types of states in the first device.

14. The method of claim 10, wherein the first device is a slave device and the second device is a master device, and wherein the analog electrical signal describes a present state of the slave device.

15. The method of claim 10, wherein the second device is a master device and the first device is a slave device, and wherein the analog electrical signal instructs the slave device to achieve the second physical state.

16. The method of claim 10, wherein the first device is an Inter-Integrated Circuit (I2C) baseboard management controller in a server blade within a server blade chassis, and wherein the second device is an I2C slave device within the server blade.

17. The method of claim 10, wherein the second device is a master device and the first device is a slave device, and wherein the method further comprises:
coupling a third device to the master device, wherein the third device is a slave device, wherein the first device and the third device both comprise an instance of the digital electrical signal generator, and wherein the first device and the third device generate the digital electrical signal at different voltage levels, wherein the different voltage levels provide an identity of the first device and the third device to the master device.

18. The method of claim 10, wherein the first device is an Inter-Integrated Circuit (I2C) device from a group consisting of an I2C bus buffer, an I2C Input/Output (I/O) expander, an I2C Digital-to-Analog Converter (DAC), an I2C Analog-to-Digital Converter (ADC), and an I2C Electrically Erasable Programmable Read-Only-Memory (EEPROM).

19. The method of claim 10, wherein the second device is a master device and the first device is a first slave device, and wherein the method further comprises:
transmitting, from the master device to a second slave device, the hybrid digital state signal as a control signal, wherein the control signal causes the second slave device to adopt a state of the first slave device.

\* \* \* \* \*